US007521818B2

(12) United States Patent
Bergmann et al.

(10) Patent No.: US 7,521,818 B2
(45) Date of Patent: Apr. 21, 2009

(54) DOOR LOCKING SYSTEM FOR A MOTOR VEHICLE

(75) Inventors: Gerald Bergmann, Oberschleissheim (DE); Richard Baur, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 42 days.

(21) Appl. No.: 11/358,037

(22) Filed: Feb. 22, 2006

(65) Prior Publication Data

US 2006/0138866 A1 Jun. 29, 2006

Related U.S. Application Data

(63) Continuation of application No. PCT/EP2004/009095, filed on Aug. 13, 2004.

(30) Foreign Application Priority Data

Aug. 23, 2003 (DE) ................................ 103 38 789

(51) Int. Cl.
*B60R 25/00* (2006.01)

(52) U.S. Cl. ..................................................... 307/10.2

(58) Field of Classification Search ................. 307/10.2
See application file for complete search history.

(56) References Cited

U.S. PATENT DOCUMENTS

| | | | | |
|---|---|---|---|---|
| 5,808,555 | A * | 9/1998 | Bartel | 340/5.72 |
| 6,107,712 | A * | 8/2000 | Yamamura et al. | 310/68 B |
| 6,188,141 | B1 | 2/2001 | Daviaud | |
| 6,255,957 | B1 * | 7/2001 | Sonderegger et al. | 340/686.1 |
| 6,519,987 | B1 | 2/2003 | Weyerstall | |
| 2002/0021010 | A1 * | 2/2002 | Hirota et al. | 292/201 |
| 2003/0210150 | A1 * | 11/2003 | Benedict | 340/575 |
| 2003/0214189 | A1 * | 11/2003 | Lupica et al. | 307/10.1 |
| 2006/0182596 | A1 * | 8/2006 | Dent | 414/699 |

FOREIGN PATENT DOCUMENTS

| | | | |
|---|---|---|---|
| CN | 2506470 | Y | 8/2002 |
| DE | 195 39 753 | A1 | 4/1997 |
| DE | 199 42 485 | A1 | 4/2001 |
| DE | 199 39 651 | A1 | 6/2001 |
| DE | 100 21 186 | A1 | 9/2001 |

(Continued)

OTHER PUBLICATIONS

International Search Report for PCT/EP2004/009095 dated Dec. 16, 2004.

(Continued)

*Primary Examiner*—Stephen W Jackson
*Assistant Examiner*—Dru M Parries
(74) *Attorney, Agent, or Firm*—Crowell & Moring LLP

(57) ABSTRACT

A position monitoring means for detecting the locked position of a locking element is assigned to at least one locking element. Furthermore, each position monitoring means is operatively connected to a control means for checking on whether a proper locked state prevails such that the actual state and the setpoint state of the locking element are comparable so that if these states do not correspond, an acknowledgment signal can be generated. In this way, it is possible to check on whether all the doors and hatches of a vehicle are properly locked after a locking operation has been performed.

16 Claims, 3 Drawing Sheets

FOREIGN PATENT DOCUMENTS

| | | | |
|---|---|---|---|
| DE | 101 55 836 | A1 | 6/2003 |
| EP | 1 247 928 | A1 | 10/2002 |
| EP | 1 331 330 | A2 | 7/2003 |

OTHER PUBLICATIONS

German Examination Report for 103 38 789.7-22 dated Mar. 12, 2004.

Written Opinion of the International Searching Authority for PCT/EP2004/009095.

German Examination Report for 103 38 789.7-22 dated Sep. 9, 2004.

Office Action received in Chinese Patent Application No. 200480023263.9 dated Jan. 9, 2009.

* cited by examiner

DOOR LOCKING SYSTEM FOR A MOTOR VEHICLE

The present application is a continuation of International Application No. PCT/EP2004/009095, filed Aug. 13, 2004, and claims priority under 35 U.S.C. § 119 to German Application No. 103 38 789.7-22, filed Aug. 23, 2003. The entire disclosure of these documents are herein expressly incorporated by reference.

BACKGROUND AND SUMMARY OF THE INVENTION

The present invention relates to a door locking system for a motor vehicle.

Door locking systems for motor vehicles with and without central lock function are known. To check on whether a vehicle is in fact properly locked, including all doors and hatches after being locked, the user must either rely on the position of the lock pins on the doors and manually check the locking of the trunk, or manually check all doors and the trunk in one inspection operation around the vehicle. A manual check by the user is a problem, in particular in systems having a so-called electronic lock. Such systems function automatically and automatically initiate an opening procedure as soon as the user (i.e., the key) is at a specified distance from the vehicle so that either the vehicle is unlocked in a fully automatic process or preparations are made for an unlocking operation and the vehicle is automatically unlocked as soon as the user operates an opening handle (see for example German Patent DE 199 42 485 A1). Conversely, the vehicle is automatically locked as soon as the key is beyond the specified distance range from the vehicle. A manual check of the lock positions by the user would thus be very tedious, and would in fact be possible only if the user is not carrying the vehicle key with him.

Furthermore, a door lock for a motor vehicle is disclosed in German Patent DE 101 55 836 A1. With this door lock the open position of the locking element is monitored. A contact switch is provided for this purpose, monitoring the open position of the locking element and generating a signal as soon as this open position has been reached, the signal being used by a control unit to interrupt the power supply to the drive motor of the locking element. This prevents the drive motor from running on block and being burdened unnecessarily.

The present invention provides a door locking system for a motor vehicle that is improved with regard to comfort and safety.

According to the present invention, this object is achieved by a locking element that can be operated for opening or locking via an actuator; a control unit for triggering the actuator; and a position monitoring means for detecting a lock position of the at least one locking element, and which is assigned to at least one locking element, wherein each position monitoring means cooperates with a control means for checking on whether a proper locked state prevails such that a setpoint state and actual state of the at least one locking element are comparable and an acknowledgement signal can be generated when the states do not match. Such a door locking system includes an actuator in the form of an electric or hydraulic drive or the like for opening and/or locking a locking element, a control unit (e.g., a separate door controller or a central engine controller) for triggering the actuator and position monitoring means (e.g., photoelectric barrier, proximity sensor or a position sensor) for position monitoring of the locking element. This system also includes control means for checking on whether a proper locked state has been achieved. In this way, the setpoint and actual conditions of the locking elements are compared so that if the states do not correspond, an acknowledgement signal is generated. This acknowledgement signal may be used either for triggering a signal generator such as a horn or headlight or the like or it may serve as an intermediate signal for generating a triggering signal for a signal generator.

The control means are preferably designed as part of door controller or a central controller. Both the locking commands and the opening commands by means of which the corresponding setpoint status of the locking elements is defined is sent to these controllers as is the locking state detected by the position monitoring means by which the particular actual state of the locking elements is defined. According to this invention, the control means are designed so that they detect an improper locking state (not locked despite a locking command having been issued) on the basis of a deviation between the setpoint and actual states and then generate an acknowledgment signal. To generate an acknowledgment signal, for example, light sources (headlights, flashing lights, rear lights, interior lights, . . . ) or acoustic sources (horn) of the vehicle are triggered in a suitable manner by a certain signal pattern.

The position monitoring may be performed in various ways. In a first possible embodiment, the position monitoring is implemented via sensors, where the sensors detect the actual position of the locking means. In a second possible embodiment of this invention, the position monitoring is implemented by analyzing internal data within the controller. For example, the self-diagnosis within the controller triggering the actuators and/or the corresponding separately designed control means or control means integrated into a controller may be used for this purpose. In particular, the typical current characteristic of the startup current and/or running current and/or square-wave current of the actuator designed as an electric motor is performed. The actual position of the locking elements or actuators is not detected in this way. Instead, the instantaneous position of the locking elements is deduced on the basis of a check of boundary conditions.

Finally, the position monitoring and function monitoring may also be performed in particular by a combination of sensor monitoring and software monitoring.

In one aspect of the present invention, a locked state detected as not the proper state is also stored in the vehicle's onboard electronics and/or in the vehicle key. In this way, the user can at any time ascertain via the onboard computer which locking element has not locked properly and is therefore possibly defective. Secondly, the user, although already at a distance from the vehicle, may at any time determine on the basis of an inquiry by his key whether his vehicle has been properly locked. To this end, the key may be queried by depressing a certain button and the information displayed by an LED lighting up (green=properly locked, red=not properly locked).

The inventive door locking system can be used in systems having a central locking function.

With a door locking system designed according to this invention, the user receives an acknowledgment after locking is completed and/or after a locking procedure is concluded, indicating whether or not the vehicle is in fact properly locked and secured. If the vehicle is not properly locked despite the locking procedure having been initiated because, for example, an actuator in the form of an electric motor for driving a locking means is defective, for example, or is simply jammed, reference is made to this situation through suitable measures such as light signals and/or horn signals. A vibrating signal on the key is also conceivable as an acknowledgment signal. This is advantageous in particular when the user has assumed despite a light warning and/or acoustic warning that his vehicle has been properly locked. This vibrating signal may advantageously be initiated with a certain time lag whenever it is not suppressed by an acknowledgement (e.g., depressing a button) on the part of the user after a locking command has been issued.

BRIEF DESCRIPTION OF THE DRAWINGS

The present invention is explained in greater detail below with reference to figures, in which.

DETAILED DESCRIPTION

Figure 1:
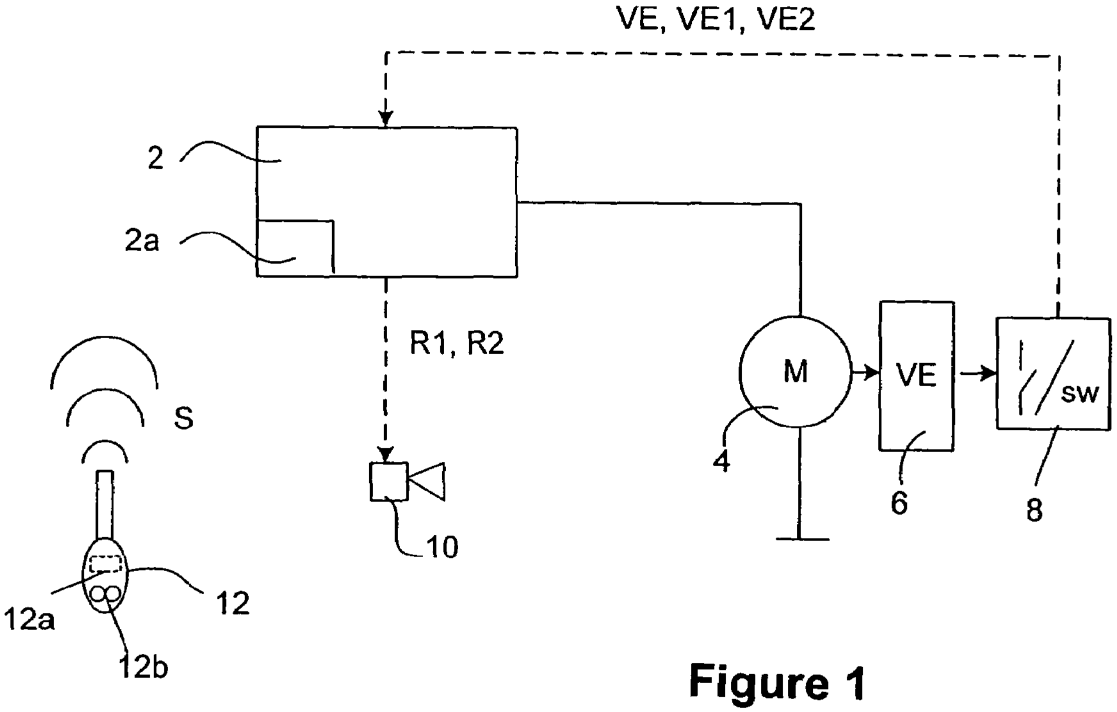
FIG. 1 shows a schematic diagram of an exemplary embodiment of the present invention.

The schematic diagram in FIG. 1 shows a control unit 2 for triggering an actuator 4 in the form of an electric motor for locking a vehicle door and/or a trunk lid and/or a sun roof and/or other doors. A locking element 6 can be operated for opening and locking procedures by means of the actuator 4. Position monitoring means 8 are assigned to each locking element 6. The position monitoring elements 8 may be designed as sensors in the form of position sensors 8*a* or the like or as software means 8*b* for analyzing internal data within the controller or in the form of a combination of sensors and software means 8*b*. The position monitoring means 8 are connected to the control unit 2 so that the latter is always notified at least of the locking position of each locking element 6. The locking positions thus detected, in particular in the event when the locking position detected is not correct, can be saved together with the assignment to the respective locking element 6 in memory means 2*a*. These memory means may be, for example, a part of the control unit 2 or a central controller.

In addition, a signal generator 10 connected to the control unit 2 is provided for signaling an incorrect locking state of at least one locking element 6. A lock signal S can be generated via a key 12 to initiate a locking operation. The locking operation may take place by remote signal or manually. A system having a control unit 2, an actuator 4 and locking signal means 8 is preferably assigned to each locking element 6. The individual control units 2 (door controllers) are each connected via a bus system to other controllers, in particular a central controller. Alternatively, the control units 2 may also be omitted and replaced by corresponding functions in a central controller.

Figure 2:
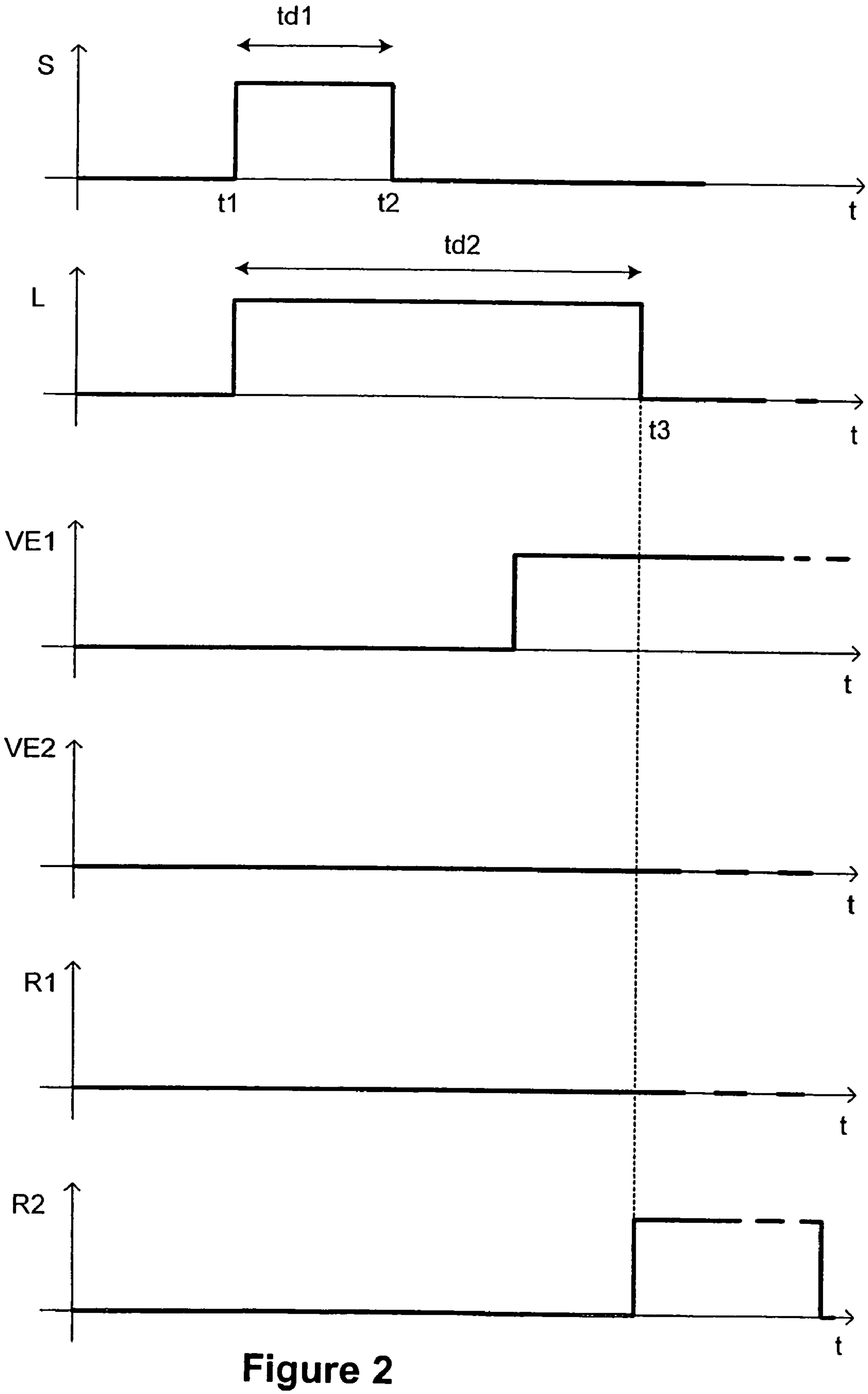
FIG. 2 shows the time chart for the locking operation with the door locking system according to this invention and FIG. 3 shows as an example the different current characteristics in triggering an actuator for correct and incorrect locking operations with a locking element.

FIG. 2 shows the time chart for a locking operation belonging to the diagram according to FIG. 1. By initiating a locking operation, the lock signal S is generated for the period of time td1 at point in time t1. Essentially simultaneously with that, a reading signal L is preferably also generated for period td2 within the control unit 2. With the descending flank of the reading signal L at point in time t3, the lock position of each locking element 6 is queried. To do so, the individual lock signals VE of the locking elements 6 are input.

In the event of proper locking of all locking elements 6, each position monitoring means 8 will yield a corresponding lock signal VE1 (here: high). For this case, the control unit 2 will supply a signal R1 (here: low) which initiates an acknowledgment signal that cannot be perceived by the user. In the event one or more locking elements 6 is not locked properly, each position monitoring means 8 of an improperly locked locking element 6 will supply a lock signal VE2 (here: low) corresponding to this state. Because of the lock signal VE2, an acknowledgment signal R2 is generated at the point in time of the query (here: the falling flank of the reading signal L). The query of the lock states explained here is to be understood only as an example. For example, the additional reading signal L may be omitted and the query may be performed with the falling flank of the lock signal S. It is also conceivable for the query to be implemented entirely independently of the lock signal S. In this case, the query would be made with only a separate test signal of the lock state prevailing at that moment in the locking elements 6 and a check will be performed to determine whether this result matches the command received (saved) last (locking command-lock active/opening command-lock inactive).

Figure 3:
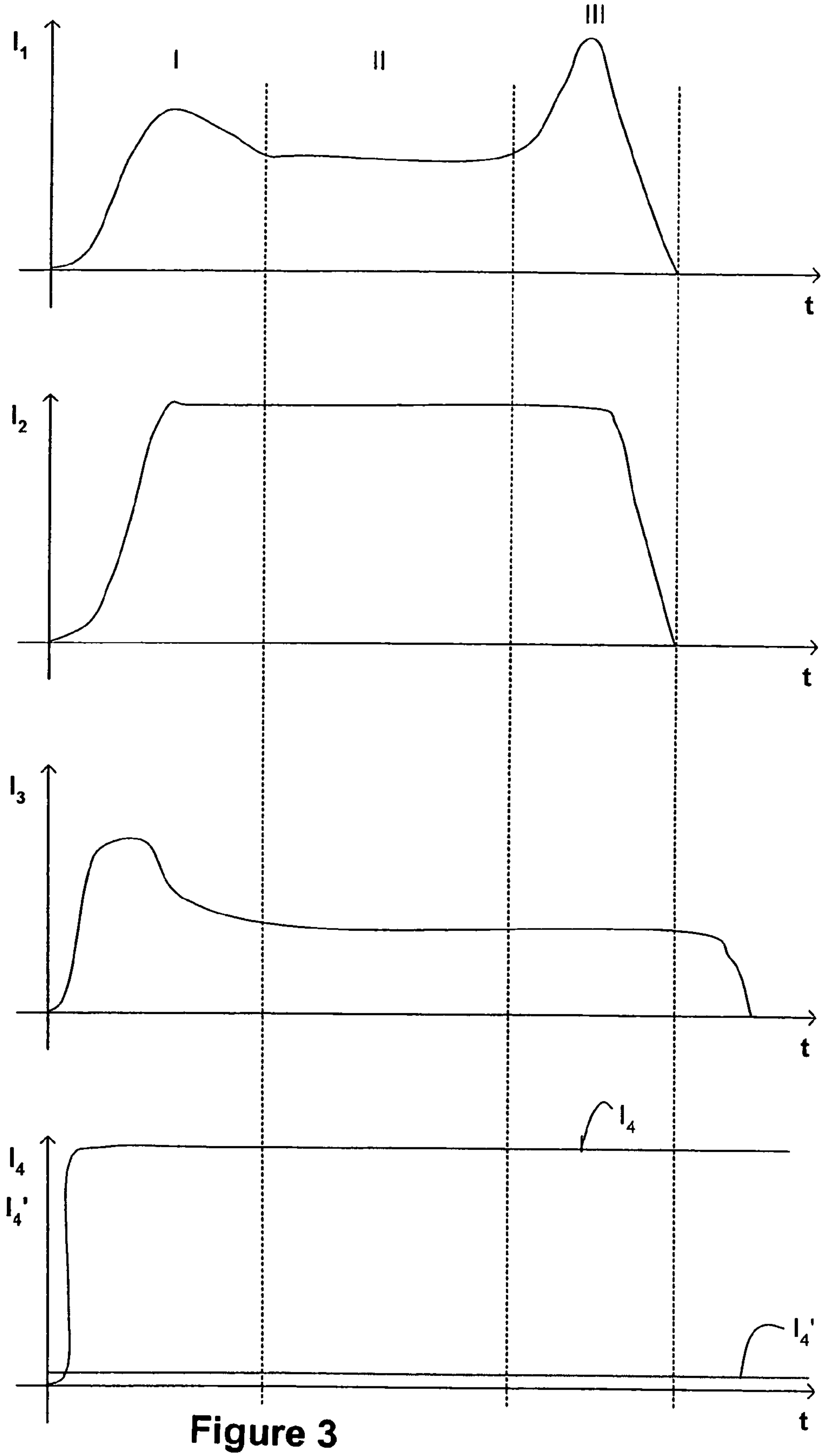

FIG. 3 shows four different current characteristics over time for controlling an actuator 4 in the form of an electric motor.

The first current characteristic $I_1(t)$ represents the triggering current for the actuator 4 in a correct error-free locking operation of the locking element 6 triggered by the actuator 4. The current characteristic of the triggering current for the actuator 4 generated in an error-free locking operation is divided into essentially three phases. In the first phase I, there is briefly an increased startup current at the start of operation of the engine, which then stabilizes at an operating current which is established in normal operation of the engine. In the second phase II, the running current that is set prevails during the entire operating phase of the engine. In the third phase III, the engine has reached its final position and nevertheless continues to receive a current supply without any change, so that it pulls a greatly increased current because of a greatly increased load (engine running on block). This current characteristic is very typical and is thus easy to monitor. Corresponding deviations in this characteristic are directly indicative of an error. The control means are preferably designed so that the type of error can be dedicated on the basis of the current characteristic detected.

The current characteristics $I_2$, $I_3$ and $I_4$ represent current characteristics when the locking operations are not correct.

The second current characteristic $I_2(t)$ illustrates a locking operation in which the locking element 6 to be driven by the motor is blocked and therefore cannot move starting at the beginning of the motor triggering and thus the motor runs on block from the beginning, drawing a greatly increased square-wave current over the entire triggering time.

In the third current characteristic $I_3(t)$, the motor is mechanically separated from the locking element 6 because of a defect. The motor is thus running without load and therefore pulls a much lower current over the entire triggering time. Furthermore, the motor is not running on block toward the end of the triggering time, so there is also no characteristic current rise toward the end of the triggering time. Finally, the last diagram shows the current characteristic $I_4(t)$ with the motor electrically separated and the current characteristic $I_4'(t)$ with the motor electrically short-circuited. All definitive current characteristics differ significantly from the current characteristic for a correct locking operation of a locking element 6, so that by simple query of current values at previously defined points in time, it is possible to deduce the occurrence of a defective locking operation and the type of error or defect that has occurred. In particular, a conclusion regarding the existence of a correct or incorrect locking operation can be derived by a query of the current values for the triggering current in the peak times of the startup current (phase I) and the blocking current (phase III) as well as a query of the running current preferably in the middle range of phase II—and if there has been an incorrect locking operation, a conclusion can also be reached regarding the type of error that has occurred.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Door locking system for a motor vehicle, comprising:

a locking element that can be operated for opening or locking via an actuator;

a control unit for triggering the actuator; and a position monitoring element that detects a lock position of the at least one locking element, and which is assigned to at least one locking element, wherein each position monitoring element provides an instantaneous current characteristic of the actuator to the control unit, and the control unit compares at least two phases of the instantaneous current characteristic with a least two phases of a setpoint current characteristic to identify deviations between the setpoint and instantaneous current characteristics, and the control unit generates an acknowledgment signal when deviations are identified each position monitoring element is arranged in the form of software for analyzing internal data within the controller.

2. Door locking system for a motor vehicle, comprising:

a locking element that can be operated for opening or locking via an actuator;

a control unit for triggering the actuator; and a position monitoring element that detects a lock position of the at least one locking element, and which is assigned to at least one locking element, wherein each position monitoring element provides an instantaneous current characteristic of the actuator to the control unit, and the control unit compares at least two phases of the instantaneous current characteristic with a least two phases of a setpoint current characteristic to identify deviations between the setpoint and instantaneous current characteristics, and the control unit generates an acknowledgment signal when deviations are identified.

3. Door locking system as claimed in claim 1, wherein the position monitoring elements are arranged to ensure analysis of the instantaneous current characteristic for each actuator to be triggered.

4. Door locking system as claimed in claim 1, further comprising:

a memory that stores the locked state of all locking elements.

5. Door locking system as claimed in claim 1, further comprising:

a key having a memory and a display that store and display the at least one locked state.

6. Door locking system as claimed in claim 1, wherein the deviations indicate an error of the at least one locking element.

7. Door locking system as claimed in claim 6, wherein the control unit compares three phases of the setpoint and instantaneous current characteristics.

8. Door locking system as claimed in claim 7, wherein the three phases include startup, running and final position phases.

9. Door locking system as claimed in claim 1, wherein a type of error or defect in an operation of the at least one locking element is determined based on the deviation.

10. A method for a door locking system in a motor vehicle, the method comprising the act of:

receiving an instantaneous current characteristic of an actuator of at least one locking element;

comparing at least two phases of the instantaneous current characteristic with a least two phases of a setpoint current characteristic to identify deviations between the setpoint and instantaneous current characteristics; and generating an acknowledgement when deviations are identified.

11. The method as claimed in claim 10, wherein the deviations indicate an error of the at least one locking element.

12. The method as claimed in claim 11, wherein three phases of the setpoint and instantaneous current characteristics are compared.

13. The method as claimed in claim 12, wherein the three phases include startup, running and final position phases.

14. The method as claimed in claim 10, further comprising the act of:

determining a type of error or defect in an operation of the at least one locking element based on the deviation.

15. The method as claimed in claim 10, wherein the acknowledgement is light signal or horn signal.

16. The method as claimed in claim 10, further comprising the acts of:

providing the acknowledgement to a key; and vibrating the key.

* * * * *